United States Patent Office 3,528,966
Patented Sept. 15, 1970

3,528,966
2-AND/OR-4-HALOGENATED 17-OXYGENATED 3-AMINOESTRA-1,3,5(10)-TRIENES
James R. Deason, Skokie, Ill., assignor to G. D. Searle & Co., Chicago, Ill., a corporation of Delaware
No Drawing. Filed Jan. 7, 1969, Ser. No. 789,615
Int. Cl. C07c *169/08; 173/00*
U.S. Cl. 260—239.55                                         10 Claims

ABSTRACT OF THE DISCLOSURE

Preparation of the captioned compounds—for example, DL - 2,4 - dibromo-3-dimethylaminoestra-1,3,5(10)-trien-17β-ol—and their valuable biological properties—specifically, anti-inflammatory activity—are disclosed.

---

This invention relates to 2-and/or-4-halogenated 17-oxygenated 3-aminoestra-1,3,5(10)-trienes and to processes for the preparation thereof. More particularly, this invention provides new, useful, and unobvious chemical compounds of the formula

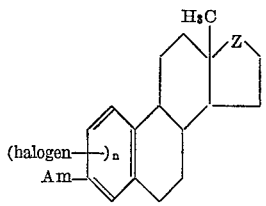

and corresponding DL mixtures, Am in the formula being representative of dialkylamino or morpholino; Z being representative of a carbonyl or a radical of the formula

in which R' represents hydrogen or lower alkanoyl and R" represents hydrogen, lower alkyl, or ethynyl; $n$ being representative of a positive integer less than 3; and the 1 or 2 halogens called for being positioned ortho to the amino substituent represented by Am. It follows that 2-halo, 4-halo, and 2,4-dihalo compounds are contemplated. The halogen constituents are preferably those having atomic numbers greater than 9 and less than 53—i.e., chlorine or bromine—albeit fluorine and iodine are, as aforesaid, likewise within the purview of the invention.

The lower alkyls specified above are methyl, ethyl, propyl, isopropyl, butyl, isobutyl, sec.-butyl, tert.-butyl, pentyl, neo-pentyl, hexyl, isohexyl, heptyl, and like monovalent, saturated, acyclic, straight- or branched-chain, hydrocarbon groupings of empirical formula

wherein $x$ represents a positive integer less than 8. Lower alkanoyls are radicals of the formula

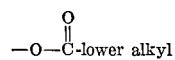

Throughout the specification and claims, only the D forms of the subject compounds are shown in the formulas, regardless of whether the involved compound is in fact D or DL. Those skilled in the art will appreciate that this is merely a convenience, and nowise restrictive of the disclosure, which is directed both to D compounds and DL mixtures corresponding as aforesaid. Not only D but also the L enantiomers comprehended can, of course, be readily obtained from the DL mixtures by well-known resolution techniques dependent on salt formation between the 3-amino constituent and an optically active acid such as d-camphosulfonic, d-α-bromocamphorsulfonic, l-malic, l-mandelic, l-menthoxyacetic, d-tartaric, l-tartaric, d-acetyltartaric, l-acetyltartaric, d-diacetyltartaric, l-diacetyltaric, etc.

Equivalent to the foregoing basic amines for the purposes of this invention are corresponding acid addition salts of the formula

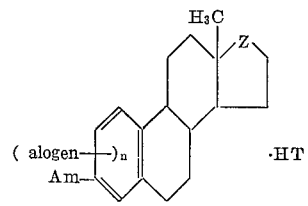

wherein Am, Z, halogen, and $n$ retain the meanings previously assigned and T represents 1 equivalent of an anion—for example, chloride, bromide, or the like—which, in combination with the cationic portion of a salt aforesaid, is neither biologically nor otherwise incompatible.

The compounds to which this invention relates are useful by reason of their valuable pharmacological properties. Thus, for example, they counteract the edema and granuloma formation characteristic of the inflammatory response to tissue insult.

The anti-inflammatory utility of the instant compounds is evident from the results of a standardized test for their capacity to inhibit the formation of granuloma tissue induced in adrenalectomized rats by implanted cotton. The procedure is a modification of one described by Dulin in Proc. Soc. Exp. Biol. Med., 90, 115 (1955). Male Sprague-Dawley rats weighing 180–220 gm. are adrenalectomized, and their drinking water is thereafter replaced by aqueous 0.86% sodium chloride supplemented during the first 24 hours by glucose q.s. 5%. On the day after the adrenalectomy, 4 pellets of dental cotton weighing 5–7 mg. apiece are separately, subcutaneously, and bilaterally implanted in the pectoral and dorsal lateral neck region of each animal, whereupon the prescribed dose (initially, 20 mg. intragastrically) of compound to be tested, dissolved or suspended in a vehicle consisting of 0.5 ml. of either corn oil or a mixture of 20 ml. of aqueous 0.86% saline with 1 drop of polysorbate 80, is administered intragastrically or subcutaneously to each of 3–6 animals. A like group of animals to which is identically and concurrently administered vehicle alone serves as controls. This treatment is repeated the next day. The day after that the animals are sacrificed; and the pellets, with asociated granuloma tissue, are dissected, dried, and weighed. A compound is considered anti-inflammatory if the mean weight of granuloma tissue in the group of animals treated therewith, adjusted to compensate for variations in dissection technique, is significantly ($P \leq 0.05$) less than the corresponding weight in the control group.

Further evidence of the anti-inflammatory utility of the instant compounds is provided by the results of a standardized test for their capacity to inhibit the edema induced in rats by injection of carrageenin. The procedure is a modification of one described by Winter et al., Proc. Soc. Exp. Biol. Med., 111, 544 (1962). Compound is administered subcutaneously or introgastrically, dissolved or suspended in 0.5 ml. of aqueous 0.86% sodium chloride, propylene glycol, a mixture of these vehicles, or corn oil, to each of 10 male rats weighing 100–130 gm. A like group of rats to which is identically and concurrently administer vehicle alone serves as controls. Precisely 1 hour later, each animal is injected under the plantar surface of each hind foot with 0.1 ml. of an aqueous 1% solution of carrageenin (Marine Colloids, Inc., Type 402). A compound is considered anti-inflammatory if the average total circumference (T) of the two hind feet in the group treated therewith, which is measured in arbitrary units 5 hr. after the carrageenin injection, is significantly ($P \leq 0.05$) less than the corresponding value (C) for the control group.

Those skilled in the art will recognize that observations of activity in standardized tests for particular biological effects are fundamental to the development of valuable new drugs, both veterinary and human.

Preparation of the subject compounds proceeds by contacting a compound of the formula

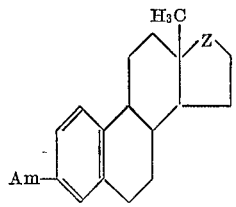

(wherein Am and Z are defined as before) with 1 or 2 equivalents of an appropriate N-haloacetamide or N-halosuccinimide in methanol, ethanol, or the like. Where 1 equivalent is used, monohalogenation predominates; with 2 or more equivalents, the dihalo product is obtained.

Instead of a 17-oxo starting material, a corresponding dialkyl ketal can be halogenated, the ketal group being removed by crystallizing the product under acidic conditions. Further alternative preparations include oxidation of the 17α-H-17β-ols hereof with chromium trioxide and sulfuric acid in acetone to the corresponding 17-ones, which in turn afford the corresponding 17α-ethynyl-17β-ols on contacting with lithium acetylide-ethylenediamine in dimethyl sulfoxide, and the corresponding 17α-lower alkyl compounds on contacting with (lower alkyl)magnesium bromide in tetrahydrofuran. The esters of the invention can be obtained from corresponding alcohols by conventional means. (For instance, see Example 3 hereinafter.)

Conversion of the amine bases of this invention to corresponding acid addition salts is accomplished by simple admixture with 1 equivalent of any of various inorganic and strong organic acids, the anionic portion of which conforms to T as hereinbefore defined.

The following examples describe in detail compounds illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

2-bromo-3-dimethylaminoestra-1,3,5(10)-trien-17-one and 4-bromo isomer

A mixture of 44 parts of 3-dimethylaminoestra-1,3,5 (10)-trien-17-one (U.S. 3,100,209), 21 parts of N-bromoacetamide, and 1600 parts of ethanol is stirred at 0–5° for 1½ hours, at which point an additional 4 parts of N-bromoacetamide in 800 parts of ethanol is introduced and stirring resumed at room temperature for ½ hour. The resultant mixture is poured into 10 volumes of water, and the mixture thus obtained is extracted with chloroform. The chloroform extract is washed with aqueous saturated sodium chloride, dried over anhydrous magnesium sulfate, and stripped of solvent by vacuum distillation. The residue is partitioned between ether and 2% hydrochloric acid. The aqueous phase is separated and neutralized with sodium hydroxide. The precipitate thrown down is filtered off and recrystallized from methanol to give 2-bromo-3-dimethylaminoestra - 1,3,5(10) - trien-17-one melting at approximately 148–149°. The product has the formula

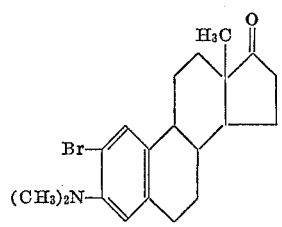

Solvent is removed from the methanol mother liquor by vacuum distillation. The residue is chromatographed on silica gel, using benzene and increasing amounts of ethyl acetate as developing solvents, then recrystallized from methanol to give 4-bromo-3-dimethylaminoestra-1,3,5(10)-trien-17-one melting at 213–216°. The product has the formula

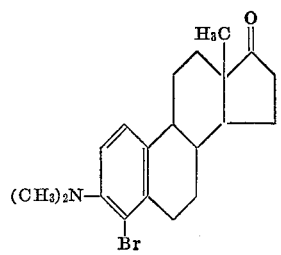

EXAMPLE 2

DL-2,4-dibromo-3-dimethylaminoestra-1,3,5(10)-trien-17β-ol

A mixture of 12 parts of DL-3-dimethylaminoestra-1,3,5(10)-trien-17β-ol (U.S. 3,383,384), 11 parts of N-bromoacetamide, and 320 parts of ethanol is stirred at 0–5° for ½ hour, whereupon stirring is stopped and the mixture allowed to stand at 0–5° overnight. The resultant solution is heated to the boling point and diluted thereat with sufficient water to induce cloudiness. Upon chilling, precipitation occurs. The precipitate is isolated by filtration and crystallized from methanol to give DL-2,4-dibromo-3-dimethylaminoestra-1,3,5(10)-trien-17β-ol melting at 202–205°. The product has the formula

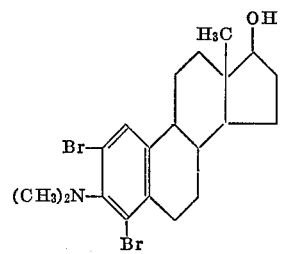

EXAMPLE 3

DL-17β-acetoxy-2,4-dibromo-3-dimethylaminoestra-1,3,5(10)-triene

A mixture of 1 part of DL-12,4-dibromo-3-dimethylaminoestra-1,3,5(10)-trien-17β-ol, 10 parts of acetic anhydride, and 10 parts of pyridine is allowed to stand at room temperatures overnight, then diluted with 10 volumes of water. The resultant precipitate is isolated by filtration, dried in air, and recrystallized from methanol to give DL-17β-acetoxy-2,4-dibromo-3-dimethylaminoestra-1,3,5(10)-triene, having the formula

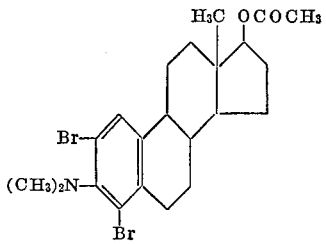

EXAMPLE 4

DL-2-bromo-3-dimethylaminoestra-1,3,5(10)-trien-17β-ol and 4-bromo isomer

A solution of 2 parts of DL-3-dimethylaminoestra-1,3,5(10)-trien-17β-ol (U.S. 3,383,384) and 1 part of N-bromoacetamide in 160 parts of ethanol is allowed to stand at room temperature for ½ hour, then stored at 0° overnight. The solution is then heated to boiling, diluted thereat to the point of incipient precipitation with water, and chilled. The precipitate thrown down is filtered off and recrystallized from methanol to give DL-2-bromo-3-dimethylaminoestra-1,3,5(10)-trien-17β-ol melting at approximately 160–161°. The product has the formula

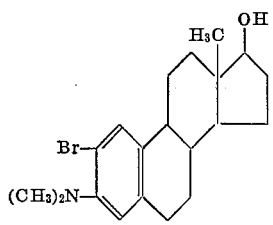

Solvent is removed from the methanol mother liquor by vacuum distillation. The residue is chromatographed on silica gel, using benzene and ethyl acetate as developing solvents, and then recrystallized from methanol to give DL-4-bromo-3-dimethylaminoestra-1,3,5(10)-trien-17β-ol, having the formula

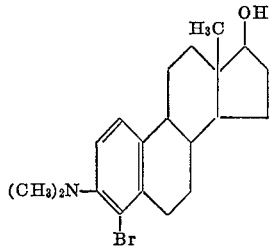

EXAMPLE 5

DL-2-bromo-3-dimethylaminoestra-1,3,5(10)-trien-17-one

To a solution of approximately 56 parts of DL-2-bromo-3-dimethylaminoestra-1,3,5(10)-trien-17β-ol in 2500 parts of acetone is added a mixture prepared by dissolving 10 parts of chromium trioxide in 20 parts of water and consecutively adding thereto 16 parts of concentrated sulfuric acid and a further 10 parts of water. Sufficient triethylamine is there upon introduced to neutralize the acid, followed by 100 parts of methanol. The resultant mixture is poured into 10 volumes of water. The precipitate which forms is filtered off, washed with water, and recrystallized from methanol to give DL-2-bromo-3-dimethylaminoestra-1,3,5(10)-trien-17-one melting at approximately 151–153°. The product has the formula reproduced in the first paragraph of Example 1.

EXAMPLE 6

(A) DL-3-morpholinoestra-1,3,5(10),8-tetraen-17-one dimethyl ketal

To a solution of 54 parts of d-camphorsulfonic acid and 79 parts of trimethyl orthoformate is added, with stirring under nitrogen, a solution of approximately 27 parts of dl-3-morpholinoestra-1,3,5(10),8-tetraen-17-one (U.S. 3,383,384) in 360 parts of benzene. Stirring is continued for 10 minutes, whereupon the reaction mixture is allowed to stand at room temperatures for 2 hours. Approximately 240 parts of benzene, followed by 30 parts of sodium methoxide is then stirred in; and the resultant mixture is partitioned between benzene and water. The benzene phase is separated, dried over anhydrous sodium sulfate, and stripped of solvent by vacuum distillation. The residual purple oil is crystallized from a mixture of dichloromethane and methanol made basic with triethylamine. The product thus isolated is DL-3-morpholinoestra-1,3,5(10),8-tetraen-17-one dimethyl ketal sintering at 125° and melting at approximately 129–130°.

(B) DL-3-morpholinoestra-1,3,5(10)-trien-17-one dimethyl ketal

To approximately 1500 parts of liquid ammonia is added, with vigorous stirring under reflux during 1 hour, 40 parts of sodium metal followed by 98 parts of DL-3-morpholinoestra-1,3,5(10),8-tetraen-17-one dimethyl ketal in approximately 615 parts of tetrahydrofuran and 245 parts of aniline. Stirring is continued for 2 hours, whereupon the blue reaction mixture is decolorized by the cautious addition of 100 parts of ammonium chloride. Excess ammonia is then distilled off, and the residue is partitioned between benzene and water. The benzene phase is separated, consecutively washed with aqueous 5% sodium hydroxide and water, dried over anhydrous sodium sulfate, filtered through diatomaceous earth, and stripped of solvent by vacuum distillation. The residual orange oil is crystallized from a mixture of dichloromethane and methanol made basic with triethylamine. The colorless product thus isolated is DL-3-morpholinoestra-1,3,5(10)-trien-17-one dimethyl ketal melting at 145–148°.

(C) DL-3-morpholinoestra-1,3,5(10)-trien-17-one

To a stirred suspension of 50 parts of DL-3-morpholinoestra-1,3,5(10)-trien-17-one dimethyl ketal in 400 parts of acetone is added 500 parts of approximately 4% hydrochloric acid. Temperature of the reaction mixture rises to 35° and solution occurs within 5 minutes. Stirring is continued for 2 hours, whereupon the reaction mixture is partitioned between dichloromethane and water. The dichloromethane phase is separated, dried over anhydrous sodium sulfate, and stripped of solvent by vacuum distillation. The residue is crystallized from a mixture of dichloromethane and absolute ethanol to give DL-3-morpholinoestra-1,3,5(10)-trien-17-one as pale green needles melting at 161–163°.

(D) DL-2-bromo-3-morpholinoestra-1,3,5(10)-trien-17-one and 4-bromo isomer

To a suspension of 68 parts of DL-3-morpholinoestra-1,3,5(10)-trien-17-one in 1600 parts of ethanol at 10° is added, with stirring, 28 parts of N-bromoacetamide. Stirring is continued for ½ hour at room temperature, whereupon stirring is discontinued and the reaction mixture allowed to stand at room temperatures overnight. Insoluble solids are filtered out, washed with methanol, dried in air, and recrystallized from a mixture of methanol and chloroform to give DL-2-bromo-3-morpholinoestra-1,3,5

(10)-trien-17-one melting at 216–218°. The product has the formula

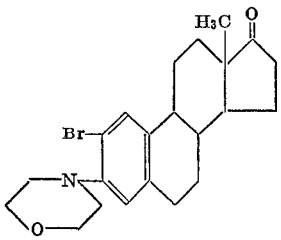

Solvent is removed from the methanol-chloroform mother liquor by vacuum distillation. The residue is chromatographed on silica gel, using benzene and ethyl acetate as developing solvents, then recrystallized from methanol to give DL-4-bromo-3-morpholinoestra-1,3,5(10)-trien-17-one melting at 183–185°, and having the formula

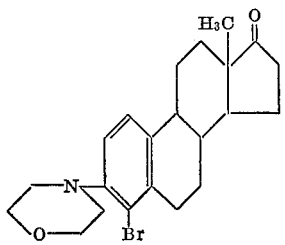

EXAMPLE 7

DL-2-bromo-17α-methyl-3-morpholinoestra-1,3,5(10)-trien-17β-ol

To 9 parts of methylmagnesium bromide in 18 parts of ether under a nitrogen atmosphere is added, with stirring during 15 minutes, approximately 8 parts of DL-2-bromo-3-morpholinoestra-1,3,5(10)-trien-17-one in 180 parts of tetrahydrofuran. Stirring is continued for 72 hours, whereupon 10 parts of methanol and then 250 parts of aqueous saturated ammonium chloride is mixed in. The aqueous phase is separated and extracted with ether, the ether extract is combined with the tetrahydrofuran phase, and the resultant solution is washed with aqueous saturated ammonium chloride, dried over magnesium sulfate, and stripped of solvent by vacuum distillation. Chromatography of the residue on silica gel, using benzene and increasing amounts of ethyl acetate, followed by recrystallization from methanol, affords DL-2-bromo-17α-methyl-3-morpholinoestra-1,3,5(10)-trien-17β-ol, having the formula

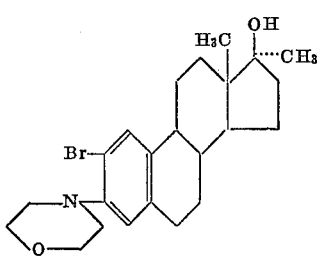

EXAMPLE 8

DL-2-bromo-17α-ethynyl-3-morpholinoestra-1,3,5(10)-trien-17β-ol

To a stirred mixture of 116 parts of lithium acetylide-ethylenediamine and 550 parts of dimethyl sulfoxide is added a solution of 63 parts of DL-2-bromo-3-morpholinoestra-1,3,5(10)-trien-17-one in 2200 parts of dimethyl sulfoxide. Stirring is continued for 2 hours, whereupon the reaction mixture is poured into 10 volumes of ice water. The precipitate thrown down is filtered off and recrystallized from a mixture of chloroform and methanol, and then from acetone, to give DL-2-bromo-17α-ethynyl-3-morpholinoestra-1,3,5(10)-trien-17β-ol melting at 208–211°. The product has the formula

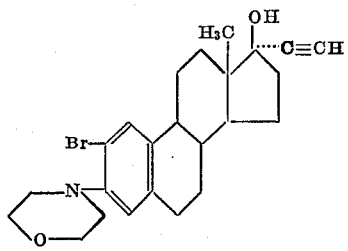

EXAMPLE 9

DL-4-chloro-3-dimethylaminoestra-1,3,5(10)-trien-17β-ol and 2-chloro isomer

A solution of 6 parts of DL-3-dimethylaminoestra-1,3,5(10)-trien-17β-ol and 2 parts of N-chlorosuccinimide in 200 parts of ethanol is allowed to stand at 0° overnight, then diluted with 5 volumes of water. Insoluble solids thrown down are filtered off and recrystallized from methanol to give DL-4-chloro-3-dimethylaminoestra-1,3,5(10)-trien-17β-ol melting at approximately 164–165°. The product has the formula

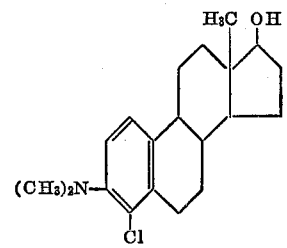

Solvent is removed from the methanol mother liquor by vacuum distillation. The residue is chromatographed on silica gel, using benzene and increasing amounts of ethyl acetate as developing solvents, then recrystallized from methanol to give DL-2-chloro-3-dimethylamino-estra-1,3,5(10)-trien-17β-ol, having the formula

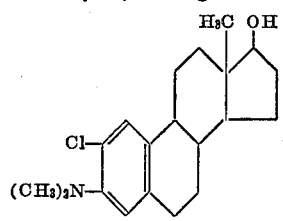

EXAMPLE 10

DL-4-chloro-3-morpholinoestra-1,3,5(10)-trien-17-one and 2-chloro isomer

A suspension of 39 parts of DL-3-morpholinoestra-1,3,5(10)-trien-17-one dimethyl ketal and 11 parts of N-chlorosuccinimide in 1600 parts of methanol is stirred at room temperatures overnight. Insoluble solids are thereupon filtered out and recrystallized from aqueous acetone acidified with hydrochloric acid, and then from methanol, to give DL-4-chloro-3-morpholinoestra-1,3,5(10)-trien-17-one melting at 190–192°. The product has the formula

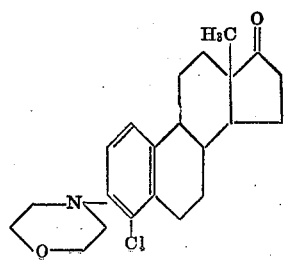

Acetone and methanol mother liquors are combined and stripped of solvent by vacuum distillation. The residue is chromatographed on silica gel, using benzene and increasing amounts of ethyl acetate as developing solvents, then recrystallized from methanol to give DL-2-chloro-3-morpholinoestra-1,3,5(10)-trien-17-one, having the formula

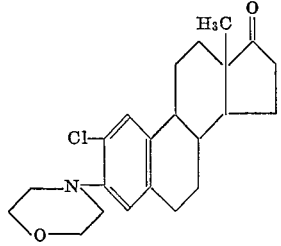

What is claimed is:
1. A compound of the formula

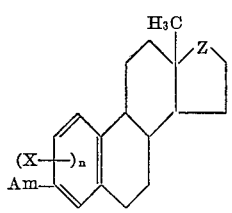

wherein Am represents di(lower alkyl)amino or morpholino, X represents halogen of atomic number greater than 9 and less than 53 ortho to the amino radical represented by Am, $n$ represents a positive integer less than 3, and Z represents carbonyl or a radical of the formula

in which R' represents hydrogen or lower alkanoyl and R" represents hydrogen, lower alkyl, or ethynyl.

2. A compound according to claim 1 having the formula

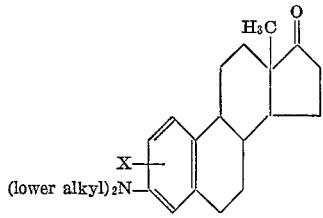

wherein X represents bromo ortho to the di(lower alkyl) amino.

3. A compound according to claim 1 in which is 2-bromo-3-dimethylaminoestra-1,3,5(10)-trien-17-one.

4. A compound according to claim 1 having the formula

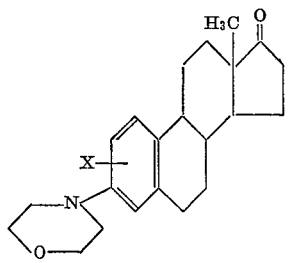

wherein X represents halogen of atomic number greater than 9 and less than 53 ortho to the morpholino.

5. A compound according to claim 1 which is DL-2-bromo-3-morpholinoestra-1,3,5(10)-trien-17-one.

6. A compound according to claim 1 having the formula

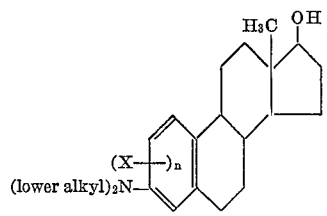

wherein X represents halogen of atomic number greater than 9 and less than 53 ortho to the di(lower alkyl)amino and $n$ represents a positive integer less than 3.

7. A compound according to claim 1 having the formula

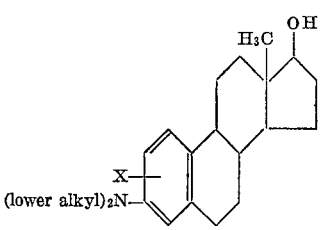

wherein X represents halogen of atomic number greater than 9 and less than 53 ortho to the di(lower alkyl)amino.

8. A compound according to claim 1 which is DL-2-bromo-3-dimethylaminoestra-1,3,5(10)-trien-17β-ol.

9. A compound according to claim 1 which is DL-4-chloro-3-dimethylaminoestra-1,3,5(10)-trien-17β-ol.

10. A compound according to claim 1 which is DL-2-bromo-17α-ethynyl - 3 - morpholinoestra-1,3,5(10)-trien-17β-ol.

References Cited
UNITED STATES PATENTS
3,060,205   10/1962   Schwenk et al. _____ 260—397.5

LEWIS GOTTS, Primary Examiner
E. G. LOVE, Assistant Examiner

U.S. Cl. X.R.
260—397.3, 397.5; 424—238, 241, 242